(12) United States Patent (10) Patent No.: US 10,703,379 B1
Harvey et al. (45) Date of Patent: Jul. 7, 2020

(54) SYSTEM AND METHODS FOR DETERMINING OWNER'S PREFERENCES BASED ON VEHICLE OWNER'S TELEMATICS DATA

(71) Applicant: STATE FARM MUTUAL AUTOMOBILE INSURANCE COMPANY, Bloomington, IL (US)

(72) Inventors: Brian N. Harvey, Bloomington, IL (US); Joseph Robert Brannan, Bloomington, IL (US); J. Lynn Wilson, Normal, IL (US); Matthew Eric Riley, Sr., Heyworth, IL (US); Ryan Gross, Normal, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 16/266,936

(22) Filed: Feb. 4, 2019

(51) Int. Cl.
*G07C 5/00* (2006.01)
*B60W 40/09* (2012.01)
*G06Q 50/30* (2012.01)
*G06Q 30/06* (2012.01)

(52) U.S. Cl.
CPC ......... *B60W 40/09* (2013.01); *G06Q 30/0645* (2013.01); *G06Q 50/30* (2013.01); *G07C 5/008* (2013.01)

(58) Field of Classification Search
CPC .... B60W 40/09; G06Q 30/0645; G07C 5/008
See application file for complete search history.

(56) References Cited

U.S. PATENT DOCUMENTS

| | | | |
|---|---|---|---|
| 9,087,099 B2 | 7/2015 | Camacho et al. | |
| 10,026,237 B1 | 7/2018 | Fields et al. | |
| 2011/0288891 A1 | 11/2011 | Zaid et al. | |
| 2013/0325521 A1* | 12/2013 | Jameel | G06Q 10/02 705/5 |
| 2015/0213420 A1 | 7/2015 | Krishnamurthy et al. | |

(Continued)

FOREIGN PATENT DOCUMENTS

WO WO-2017142536 A1 8/2017

OTHER PUBLICATIONS

Griffiths, "Telematics is revolutionising fleet management", Connected Car, Financial Times. 1-4 (2016).

(Continued)

*Primary Examiner* — Hongmin Fan
(74) *Attorney, Agent, or Firm* — Lee & Hayes, P.C.

(57) ABSTRACT

Embodiments described herein receive telematics data collected over a period of time, wherein the telematics data is indicative of operation of a vehicle by an owner of the vehicle during the period of time; analyze the telematics data to identify driving behavior(s) of the owner during the period of time; predict one or more user preference values of a vehicle-sharing platform profile of the owner based on the identified one or more driving behaviors, wherein the one or more user preference values define one or more criteria for vehicle renters with whom the first vehicle can be shared; apply the one or more criteria to a potential vehicle renter; and cause an indication of the first vehicle of the owner to be displayed via a mobile device of the potential renter only if the potential vehicle renter satisfies the one or more criteria.

20 Claims, 5 Drawing Sheets

(56) References Cited

U.S. PATENT DOCUMENTS

2015/0371153 A1    12/2015   Lohmeier et al.
2017/0098231 A1    4/2017   Dietrich
2017/0206717 A1    7/2017   Kuhnapfel
2018/0075380 A1    3/2018   Perl et al.

OTHER PUBLICATIONS

Hampshire et al., "Market Analysis and Potential Growth", Peer-to-Peer Carsharing, Transportation Research Record Journal of the Transportation Research Board. 119-126 (2011).
Goodwin, "OECD International Transport Forum, Leipzig, May 2008 Transport and Energy: The Challenge of Climate Change", Policy Incentives to Change Behaviour in Passenger Transport, The Centre for Transport & Society. 1-34 (2008).
Kantor, "Design of Algorithms for Payment Telematics Systems Evaluating Driver's Driving Style", Transactions of Transport Sciences, 7:9-16 (2014).
Mortimer, "The effect of 'smart' financial incentives on driving behaviour of novice drivers", Accident Analysis and Prevention, 119:68-79 (2018).

\* cited by examiner

SYSTEM AND METHODS FOR DETERMINING OWNER'S PREFERENCES BASED ON VEHICLE OWNER'S TELEMATICS DATA

FIELD OF THE DISCLOSURE

The present disclosure relates to vehicle renting/sharing, and, more particularly, to predicting user preferences based on telematics data.

BACKGROUND

A peer-to-peer (P2P) car sharing model enables vehicle owners to rent their vehicles to others for short periods of time. Participating vehicle owners typically charge a fee to rent out their vehicles, and participating renters drive the vehicles and pay for the time they need to use them. The participating owners and renters may use a common vehicle-sharing platform, which may be in the form of a website or mobile application, to manage the scheduling of and payment for the vehicles.

Typically, a participating vehicle owner may use the vehicle-sharing platform to i) describe their vehicle(s), such as the make and model, that are available for rent, ii) set a location for pickup and return of the vehicle(s), and iii) mark available days of the week that their vehicle(s) are available for rent. Participating renters may access the vehicle-sharing platform to search for a vehicle to rent according to their criteria, such as the time period they will need to drive the vehicle, the type of desired vehicle, price, etc. The success of such a vehicle-sharing platform often depends on a sense of trust between the participating vehicle owners and renters. To build trust, vehicle-sharing platforms typically require the participating vehicle owners and renters to verify their identities, such as by entering in their license number and credit card information. Vehicle-sharing platforms may also set general expectations that apply to all participating renters, such as a no smoking policy in the vehicle.

Despite the high-level trust mechanisms mentioned above that are already in place, conventional vehicle-sharing platforms lack low-level trust mechanisms. For example, recently proposed vehicle-sharing platforms are unable to generate and enforce personal preferences onto participating renters to allow only a subset of the participating renters to rent an owner's vehicle or, at best, allow only high-level filtering mechanisms (e.g., by only enabling owners to filter according to overall reviews/ratings that other owners have given to the renters in the past). In one scenario, although all verified participating renters have approved driving histories, participating vehicle owners may only trust participating renters that have a higher standard of driving etiquette. Existing vehicle-sharing platforms simply do not include a means for generating and enforcing these sorts of personal preferences onto participating renters. Such shortcomings have to date been inadequately addressed, if at all.

BRIEF SUMMARY

In some aspects, embodiments described herein may predict user preferences for a vehicle owner, by analyzing telematics data indicative of operation of a vehicle by the vehicle owner to identify one or more driving behaviors of the vehicle owner. As an example, a baseline assumption may be made that the vehicle owner would regard as "acceptable" vehicle renters those who exhibit qualities similar to, or more conservative than, the vehicle owner's driving behaviors. Accordingly, the renter may be required to exhibit similar (or more conservative) driving behavior as that of the vehicle owner to be authorized to rent the owner's vehicle. The renter's driving behavior may be known based on telematics data associated with the renter. As an example, if a driving behavior of a particular vehicle owner reflects that the owner routinely drives under the speed limit, a potential renter may exhibit a similar driving behavior.

In one aspect, a computer-implemented method of predicting a user preference may include (1) receiving, by one or more processors, telematics data collected over a first period of time, wherein the telematics data is indicative of operation of a first vehicle by an owner of the first vehicle during the first period of time; (2) analyzing, by the one or more processors, the telematics data to identify one or more driving behaviors of the owner during the first period of time; (3) predicting, by the one or more processors, one or more user preference values of a vehicle-sharing platform profile of the owner based on the identified one or more driving behaviors, wherein the one or more user preference values define one or more criteria for vehicle renters with whom the first vehicle can be shared; (4) applying, by the one or more processors, the one or more criteria to a potential vehicle renter; and (5) causing, by the one or more processors, an indication of the first vehicle of the owner to be displayed via a mobile device of the potential renter only if the potential vehicle renter satisfies the one or more criteria.

In one aspect, a vehicle-sharing platform may include (1) one or more processors and (2) memory coupled to the one or more processors and storing executable instructions that when executed by the one or more processors cause the vehicle-sharing platform to: (a) receive telematics data collected over a first period of time, wherein the telematics data is indicative of operation of a first vehicle by an owner of the first vehicle during the first period of time; (b) analyze the telematics data to identify one or more driving behaviors of the owner during the first period of time; (c) predict one or more user preference values of a vehicle-sharing platform profile of the owner based on the identified one or more driving behaviors, wherein the one or more user preference values define one or more criteria for vehicle renters with whom the first vehicle can be shared; (d) apply the one or more criteria to a potential vehicle renter; and (e) cause an indication of the first vehicle of the owner to be displayed via a mobile device of the potential renter only if the potential vehicle renter satisfies the one or more criteria.

In one aspect, a non-transitory, tangible computer-readable medium storing machine readable instructions that, when executed by one or more processors, may cause the one or more processors to (1) receive telematics data collected over a first period of time, wherein the telematics data is indicative of operation of a first vehicle by an owner of the first vehicle during the first period of time; (2) analyze the telematics data to identify one or more driving behaviors of the owner during the first period of time; (3) predict one or more user preference values of a vehicle-sharing platform profile of the owner based on the identified one or more driving behaviors, wherein the one or more user preference values define one or more criteria for vehicle renters with whom the first vehicle can be shared; (4) apply the one or more criteria to a potential vehicle renter; and (5) cause an indication of the first vehicle of the owner to be displayed via a mobile device of the potential renter only if the potential vehicle renter satisfies the one or more criteria.

BRIEF DESCRIPTION OF THE DRAWINGS

The figures described below depict various aspects of the system and methods disclosed herein. It should be understood that each figure depicts an aspect of a particular aspect of the disclosed system and methods, and that each of the figures is intended to accord with a possible aspect thereof. Further, wherever possible, the following description refers to the reference numerals included in the following figures, in which features depicted in multiple figures are designated with consistent reference numerals.

Although the following text sets forth a detailed description of numerous different aspects, it should be understood that the legal scope of the description is defined by the words of the claims set forth at the end of this patent. The detailed description is to be construed as exemplary only and does not describe every possible aspect since describing every possible aspect would be impractical, if not impossible. Numerous alternative aspects may be implemented, using either current technology or technology developed after the filing date of this patent, which would still fall within the scope of the claims.

DETAILED DESCRIPTION

Generally, a method, apparatus, systems, and non-transitory media are described that may, inter alia, automatically predict a vehicle owner's user preferences that define one or more criteria for vehicle renters with whom the owner's vehicle can be shared. A vehicle-sharing platform may automatically predict the preferences based on telematics data that is indicative of driving behavior of the owner. Only prospective renters satisfying the criteria corresponding to the preferences may be eligible to rent the owner's vehicle. For example, a vehicle-sharing application may only display/indicate the owner's vehicle to renters who satisfy the criteria. In some embodiments, the preferences may be displayed to the vehicle owner, and the vehicle owner may manually modify the preferences if desired.

Exemplary Vehicle-Sharing Platform

Figure 1:
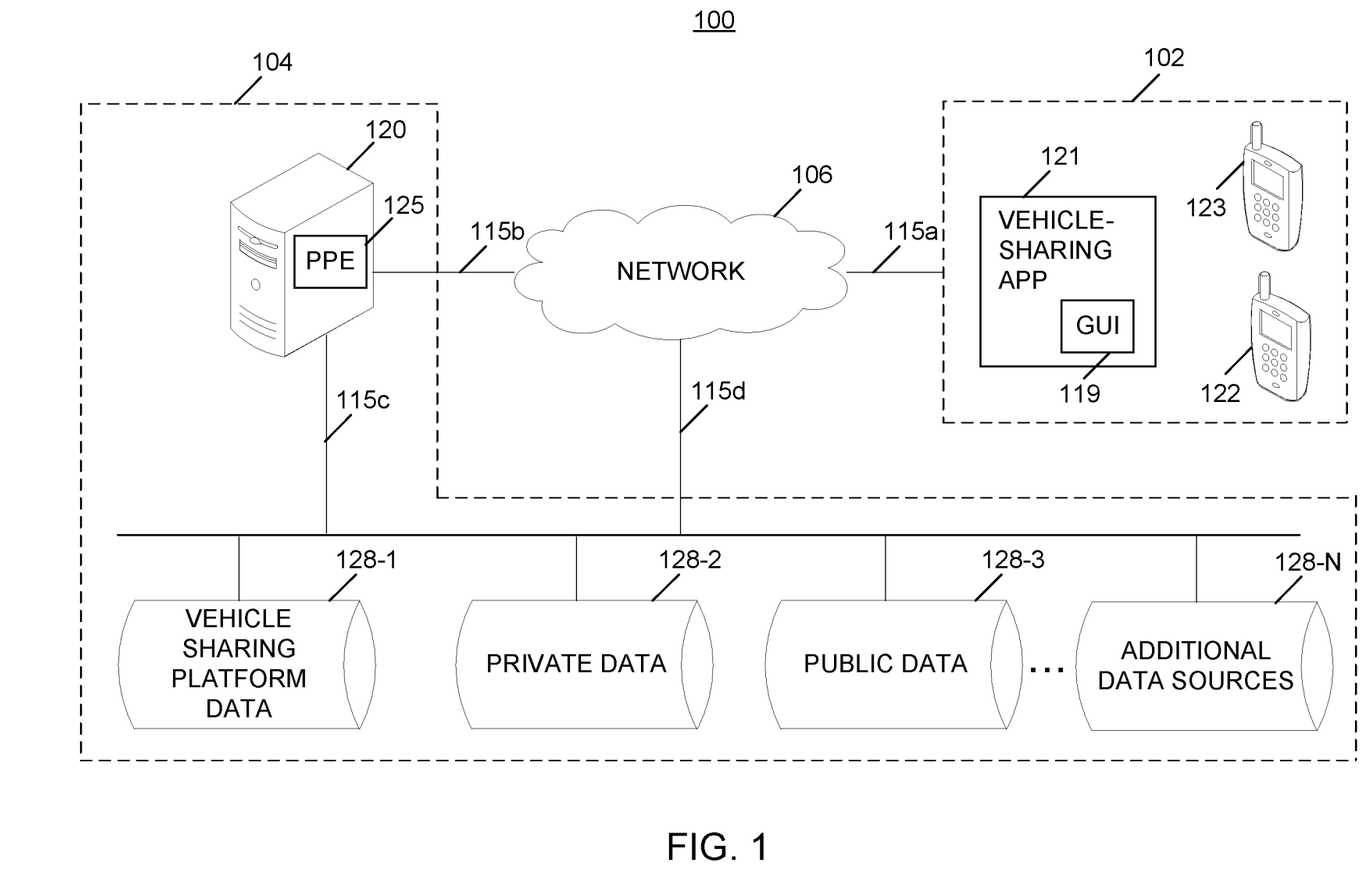
FIG. 1 illustrates a block diagram of an exemplary vehicle-sharing platform in accordance with one aspect of the present disclosure.

FIG. 1 illustrates a block diagram of an exemplary vehicle-sharing platform 100 in accordance with one aspect of the present disclosure. Vehicle-sharing platform 100 may include front end devices 102, a data system 104, and/or a network 106. The system may include additional, fewer, or alternate components, including those discussed elsewhere herein.

Vehicle-sharing platform 100 may facilitate the prediction of user preferences for participating vehicle owners, and further manage the scheduling of and payment for their vehicles with participating renters that meet the vehicle use preferences. Generally, requests to rent vehicles from participating renters are only approved if the renters meet user preferences. In some aspects, for participating renters to even be able to view vehicle(s) provided by a particular vehicle owner as available on the vehicle-sharing platform 100, participating renters must meet predicted user preferences, which the particular vehicle owner may have confirmed. Specifically, in order to predict the user preferences, the platform 100 may be configured to identify one or more driving behaviors of a participating vehicle owner based on telematics data indicative of operation of a vehicle by the participating owner during a predefined period of time. The time period may be contiguous, or include multiple non-contiguous blocks of time. The platform 100 may display the user preferences (or parameters and/or values thereof) via a graphical user interface (GUI), and the vehicle owner may also modify the predicted user preferences via the GUI. Participating renters generally must satisfy the modified user preferences in order for the GUI to display/indicate the available vehicle(s) provided by that vehicle owner.

Front end devices 102 may include devices 122 and 123. Each of devices 122, 123 may include any suitable communication device that is configured to facilitate user interaction and exchange data with network 106. For example, devices 122, 123 may be mobile devices (e.g., smartphones, cell phones, tablets, netbooks, phablets, smart glasses, smart contact lenses, electronic wearable devices, personal desktop computers, laptops, pagers, personal digital assistants, smart watches, and/or other computing devices capable of wired and/or wireless communication). In the embodiments discussed herein, device 122 belongs to a participating renter and device 123 belongs to a participating vehicle owner. Each of the devices 122, 123 may be configured to execute a vehicle-sharing application to facilitate renting/sharing of an owner's vehicle. As such, vehicle-sharing platform 100 may support a P2P vehicle sharing model that enables a participating vehicle owner to rent/share his vehicle to a participating renter for agreed upon periods of time. The vehicle-sharing applications executing on devices 122 and 123 may be considered to be front end interfaces associated with the vehicle-sharing platform 100. Accordingly, in various aspects, each of the devices 122, 123 may be any suitable device configured to display a graphical user interface (GUI) 119 within a dedicated application 121 (i.e., vehicle-sharing application) to enable users to interact with devices 122, 123. Although FIG. 1 illustrates GUI 119 as part of dedicated application 121, those of ordinary skill in the relevant art(s) will appreciate that vehicle-sharing platform 100 may be implemented in other ways without departing from the spirit and scope of the present disclosure. For example, application 121 may be a web browser application, and GUI 119 may be provided by JavaScript or other instructions of a web page stored on a remote server.

In various aspects, devices 122, 123 may be configured to receive data from, and send data to, data system 104 via a wired or wireless link 115a and network 106. Notably, owner device 123 may facilitate collecting information from a user and communicating with data system 104 via network 106 to display one or more predicted user preferences for the user via GUI 119. Renter device 122 may be configured to receive data from data system 104 and to display an indication of (e.g., picture of, make/model of, etc.) the owner's vehicle(s) via GUI 119 if the user (i.e., renter) of the renter device 122 satisfies the preferences of the vehicle owner.

Network 106 may include any appropriate combination of wired and/or wireless communication networks. For example, network 106 may include any combination of a local area network (LAN), wireless local area network (WLAN), a metropolitan area network (MAN), a wide area network (WAN), and may facilitate a connection to the Internet. To provide further examples, network 106 may include wired telephone and cable hardware, satellite, cellular phone communication networks, etc.

Data system 104 may include a computing device 120 and N databases 128-1, 128-2, . . . 128-N. Although a single computing device 120 is illustrated in FIG. 1, one of ordinary skill in the art will understand that two or more computing devices 120 may be located across one or more locations. In some aspects, computing device 120 may be implemented with hardware and/or software components, some of which may facilitate communications with one or more databases 128-1, 128-2, . . . 128-N via any suitable number of wired and/or wireless links, such as 115b, 115c, and/or 115d.

The dedicated application 121 described above that is included in the front end devices 102 (e.g., devices 122, 123) may be associated with the computing device 120. Other various software applications installed in front end devices 102 (e.g., devices 122, 123), such as weather applications, map applications, etc., may be supported by the computing device 120 or other third party servers (e.g., commercial vendors, governmental entities, industry associations, non-profit organizations, or others). The computing device 120 may be configured to receive data from the various software applications of the front end devices 102 (e.g., by way of suitable application program interfaces) via network 106. Although additional wireless links are not shown in FIG. 1 for purposes of brevity, those of ordinary skill in the relevant art(s) will appreciate that computing device 120 may communicate with any of databases 128-1, 128-2, . . . 128-N using any combination of wired and/or wireless links. Furthermore, those of ordinary skill in the relevant art(s) will also appreciate that different types of networks and/or links may be implemented based upon the type of data that is accessed from a respective database 128-1, 128-2, . . . 128-N. For example, a private network and one or more secure links may be implemented to facilitate communications between computing device 120 and any of databases 128-1, 128-2, . . . 128-N (e.g., via link 115c) to enable computing device 120 to retrieve data of a sensitive, private, and/or proprietary nature. To provide another example, a link via the Internet may be implemented for communications between computing device 120 and any of databases 128-1, 128-2, . . . 128-N (e.g., via links 115c and 115d) to enable computing device 120 to retrieve data that is publicly available or not of a sensitive nature.

Although databases 128-1, 128-2, . . . 128-N are illustrated in FIG. 1 as separate databases and separate from computing device 120, in some aspects data stored in one or more of databases 128-1, 128-2, . . . 128-N is additionally or alternatively stored in one or more storage components integrated as part of (or otherwise associated with) computing device 120. Alternatively, or in addition, one or more of the databases 128-1, 128-2, . . . 128-N may be associated with a third party server.

In an aspect, one or more databases 128-1, 128-2, . . . 128-N may store historical data that describes driving behavior of a vehicle owner, or vehicle-sharing application usage patterns of the vehicle owner. For example, historical data may include traffic data, vehicle collision data (e.g., insurer claims data), geographic location data (e.g., GPS data), mobile device data, telematics data, vehicle mounted-sensor data, autonomous vehicle sensor data, environment data (e.g., weather data) and/or image data, which may be collected by the vehicle-sharing platform 100 by way of the computing device 120 and/or device 123, third party servers, and/or sensors associated with an owner's vehicle before, during, and/or after a trip. As such, historical data may provide contextual information of the vehicle related to vehicle damage, extent of injuries at a vehicle collision, number and identification of vehicles involved, dates and times of vehicle use, duration of vehicle use, mobile device GPS location, vehicle GPS location, speed, RPM or other tachometer readings of the vehicle, lateral and longitudinal acceleration of the vehicle, environment of the vehicle during vehicle operation (e.g., traffic, construction, accidents in the area, weather or road conditions at the time of an accident or duration of vehicle use), and/or other information relating to use of the vehicle. Historical data may also describe vehicle-sharing application usage patterns of the vehicle owner. For example, historical data may also include mobile device data or other data indicating requests containing details of a rental trip that were approved or rejected by participating vehicle owners, and feedback or complaints submitted by the participating vehicle owners as to the treatment of their vehicles by the renters. Historical data collected by computing device 120 may be stored in vehicle-sharing platform database 128-1, and historical data collected by third-party servers may be stored in private database 128-2 and/or public database 128-3, for example.

In another aspect, one or more of databases 128-1, 128-2, . . . 128-N may store historical data that describes driving behaviors of prospective renters. Similar to the historical data that describes driving behavior of a vehicle owner mentioned above, historical data that describes driving behaviors of prospective renters may include vehicle collision data, geographic location data (e.g., GPS data), mobile device data, telematics data, vehicle mounted-sensor data, autonomous vehicle sensor data, environment data (e.g., traffic and/or weather data) and image data, which may be collected by the vehicle-sharing platform 100 by way of the computing device 120 and/or device 122, third party servers, or sensors associated with a renter's vehicle before, during, and/or after a trip.

In another aspect, historical data stored in the one or more databases 128-1, 128-2, . . . 128-N may include rental evaluation data that includes assessments of rental trips completed by the renters using the vehicle-sharing platform 100. The assessments may be automatically determined by the vehicle-sharing platform 100, or may be ratings, feedback, or comments for the renters provided by the vehicle owners from whom the renters have rented vehicles.

As with historical data relating to the vehicle owner, historical data relating to the renter that is collected by computing device 120 may be stored in vehicle-sharing platform database 128-1, and historical data collected by third-party servers may be stored in private database 128-2 and/or public database 128-3, for example. Rental evaluation data collected by computing device 120 may be stored in vehicle-sharing platform database 128-1, for example. It should be noted that, to comply with state, local, and/or federal privacy regulations, the computing device 120 may need to obtain the user's consent to store and/or access the historical data.

Private database 128-2 may include proprietary information or any suitable data related to the user that may be collected and/or mined from one or more sources that may not otherwise be readily or conveniently available via public channels. This propriety information may include, for example, information gathered from third party servers related to the user's driver's license suspensions, driving citations (e.g., moving violations) issued to the user, accident reports regarding details of accidents in which the user has been involved, the user's credit score history, claims data, vehicle event data recorder information or any suitable vehicle telematics data, and/or user account information such as credit card accounts, mortgages, financial institutions, for example. Claims data may be associated with actual insurance claims arising from real world vehicle collisions, and generally represents insurance claims filed by vehicle owners. Claims data may identify a particular collision, policy owners, involved vehicles, a location where the collision occurred, property involved, repair and/or replacement costs and/or estimates, a time and date of the collision, and/or various other information. In some embodiments, the computing device 120 may identify driving behavior of the vehicle owner by solely analyzing the telematics data of the owner's vehicle. Particularly, the computing device 120 may analyze telematics data associated with the owner to identify driving behaviors of the vehicle owner, such as "low risk" driving tendencies (e.g., owner drives the speed limit 90% of the time). Using the same immediate example, if claims data shows that the vehicle owner was involved in 3 accidents in a span one of year, an algorithm used by the computing device 120 may upgrade the "low risk" driving behavior to a "high risk" driving behavior based on a pre-determined weight assigned to the claims data.

Although some of this information may be publicly available, this information may not be easily obtained online and/or may need to be appropriately formatted for database storage. Therefore, examples of third party sources of such proprietary information may include any suitable source of census reports, crime reports, weather reports, vehicle history reports, etc. As mentioned above, to comply with state, local, and/or federal privacy regulations, the computing device 120 may need to obtain the user's consent to access this information via GUI 119.

Public database 128-3 may represent one or more public data sources. Database 128-3 may include information about the user (e.g., a participating renter) that is readily available via one or more public channels. Examples of public data source information may include a user's current address, current occupation, marital status, etc. Examples of the public data sources may include city record data, and publicly available social networking data, such as data collected from a networking website such as LinkedIn.com, for example.

Prior to storage in the databases 128-1, 128-2, . . . 128-N, some of the historical data and/or rental evaluation data may have been uploaded to the computing device 120 via the network 106 from the devices 122, 123, third party servers, and/or sensors associated with a vehicle. Additionally, or alternatively, some of the data may have been generated by the computing device 120. The computing device 120 may store data in the databases 128-1, 128-2, . . . 128-N and/or may access data stored in the databases 128-1, 128-2, . . . 128-N when executing various functions and tasks associated with the methods described herein.

In accordance with various aspects, computing device 120 may facilitate the collection of information (e.g., identity data including a user name and password affiliated with an account profile) from a vehicle owner and/or historical data of the vehicle owner from one or more of databases 128-1, 128-2, . . . 128-N. Analysis of the historical data stored in databases 128-1, 128-2, . . . 128-N may be used to predict a vehicle owner's rental preferences for sharing vehicles with renters. For example, if telematics data corresponding to the vehicle owner's driving behavior demonstrates that the owner never drove over 70 mph, computing device 120, by executing a preference prediction engine (PPE) 125, may predict that driving the speed limit is a preference of the owner with respect to any potential renter of the owner's vehicle. As another example, if telematics data corresponding to the vehicle owner's driving behavior demonstrates that the owner exhibits "average" braking behavior (e.g., as indicated by a number of braking events, whether such braking is hard or soft, deceleration rate during braking, distance to stop, etc.), computing device 120 executing PPE 125 may predict that highly alert driving (or "no hard braking," etc.) is a preference that the owner desires in a potential renter of the owner's vehicle. The computing device 120 may then send predicted preferences data to owner device 123 to be displayed via GUI 119 within the dedicated application 121. As such, because the computing device 120 may in some embodiments retrieve information from one or more of databases 128-1, 128-2, . . . 128-N to predict preferences, a vehicle owner need not provide information that would otherwise be required to learn owner preferences. Therefore, the GUI 119 presents information efficiently, which improves the usability of vehicle-sharing applications executing in owner device 123.

Figure 2:
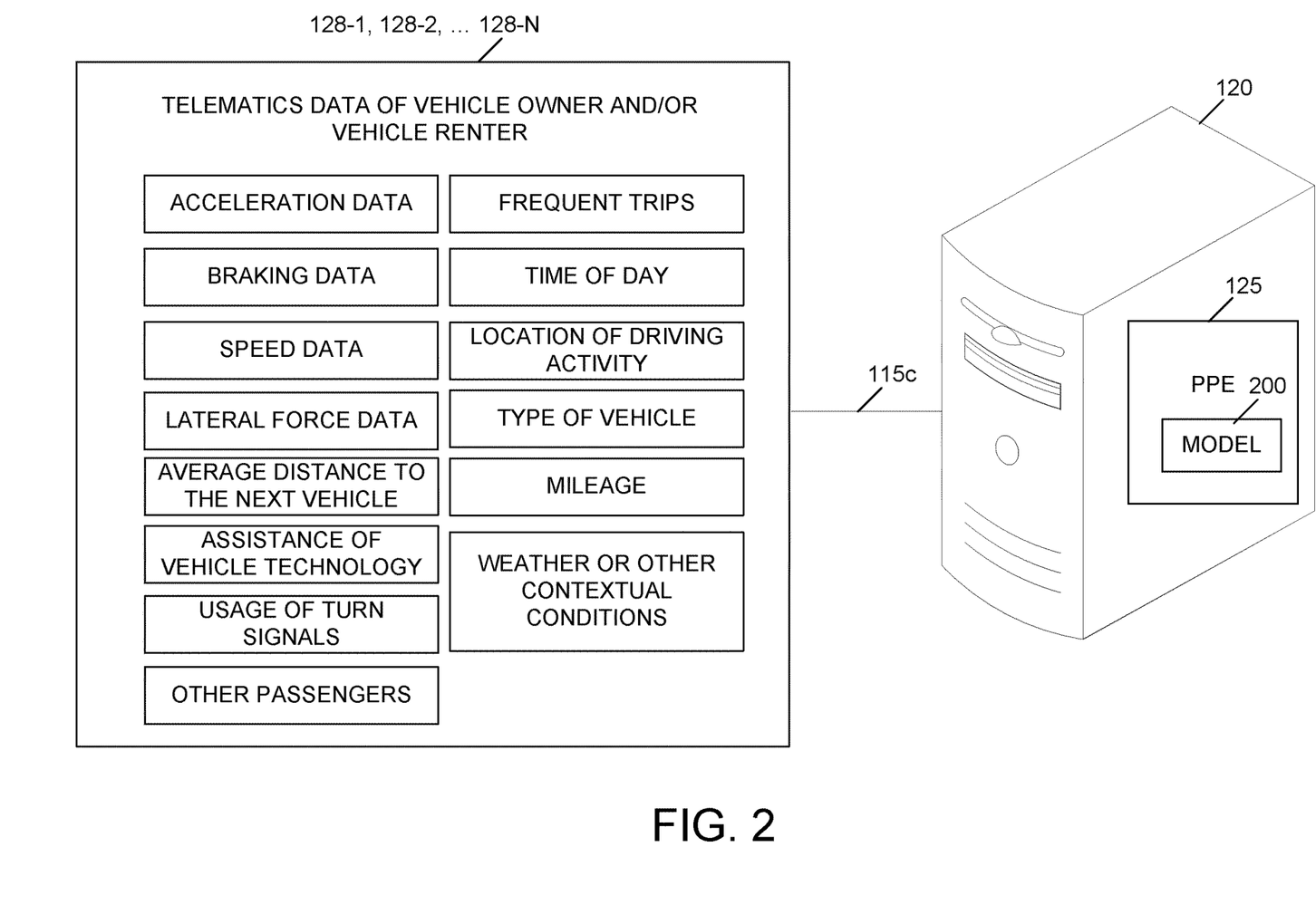
FIG. 2 illustrates a block diagram of exemplary driving behavior identification based upon analyzing telematics data.

Exemplary Driving Behavior Identification Based Upon Analysis of Telematics Data As shown in FIG. 2, the telematics data and/or other historical data collected or generated by computing device 120 may be analyzed to assess various driving behaviors for a user (i.e., vehicle owner or vehicle renter). The telematics data and/or other historical data may indicate the user's behavior with respect to vehicle operations, such as the following: braking (deceleration); speed; acceleration; turning; average distance to the next vehicle—whether ahead, behind, or adjacent (e.g., traveling along side in the same direction of traffic); usage of vehicle technology (such as accident avoidance technology); usage of turn signals; and/or other driving characteristics. The data may also indicate whether a user usually drives alone or with other passengers; the typical roads taken during a commute to and from work; time of day information; the location(s) where the user typically drives; the type of vehicle(s) that the user typically drives (type, make, or model of a vehicle); the weather conditions that the user drives in; a percentage of time that the user operates a vehicle; whether the user drives a large percentage of time adjacent to other vehicles traveling in the same direction (such as on a four-lane highway); whether the user typically drives too slow or too fast in relation to the posted speed limit, and/or other tendencies, including those discussed elsewhere herein.

Telematics data from a vehicle driven by the vehicle renter (i.e., regardless of whether the vehicle is owned by another person or the vehicle renter) may be analyzed to determine the driving behavior of the vehicle renter, and telematics data from an owner's vehicle may be analyzed to determine the driving behavior of the vehicle owner. In some embodiments, the computing device 120 may be programmed to detect one or more sets of operation data (e.g., acceleration data, braking data, speeding data) within the renter's or owner's telematics data to identify one or more driving behaviors.

Upon identifying one or more driving behaviors of the vehicle owner, the computing device 120 may predict one or more corresponding user preference values of the vehicle owner. For example, if a particular vehicle owner's driving behavior related to braking indicates that the owner does not hard brake often, the computing device 120 may predict that the owner would only desire renters who also do not hard brake often. To apply this preference, the computing device 120 may set a brake threshold value (e.g., average number of hard brake events for a given period of time, maximum number of hard brake events for a given period of time, etc.) to a predetermined value indicative of a low number of hard brake events, for example. As another example, the computing device 120 may lower the brake threshold value from an average threshold value indicative of an average number of hard brake events performed by thousands of drivers.

The one or more user preference values define one or more criteria for vehicle renters with whom the owner's vehicle can be shared. Therefore, to apply the one or more criteria to a potential vehicle renter, the computing device 120 may compare a potential renter's telematics data, or data derived therefrom, with the one or more user preference values. For example, the computing device 120 may compare the potential renter's braking events collected over a period of time (e.g., days, weeks, months) with the owner's preference value (e.g., the brake threshold value discussed above) to determine whether the vehicle-sharing platform will permit the owner's vehicle to be displayed to the potential renter.

Although the examples described above refer to preference values related to braking behaviors, user preference values related to any of the types of vehicle operations described above with respect to FIG. 2, or other driving behaviors, are also contemplated. Moreover, while the examples described above predict preference values corresponding to the number of times a particular type of driving operation occurred during a predetermined period of time (e.g., number of braking events that occurred in a week), preference values may be predicted based on other metrics.

For instance, in some embodiments, risk scores may be calculated to ensure that a potential renter does not drive in a riskier manner than the owner. For example, the computing device 120 may be configured to assign an owner or renter who drives over the speed limit or tailgates too frequently (e.g., as shown by frequent braking) with a high risk score, which may indicate risk-prone driving behavior. Similarly, the computing device 120 may be configured to assign an owner or renter who drives the speed limit or only drives during the day with a low driving score, which may indicate risk-averse driving behavior. Accordingly, computing device 120 may evaluate and/or analyze the telematics data to identify low risk driving, high risk driving, or any other suitable risk levels or classifications. In some embodiments, additional information, such as other historical data, may then be used by the computing device 120 to adjust a risk score for the owner or renter. For example, if the owner or renter chooses to drive during dangerous weather (e.g., blizzard, heavy rain) as determined by analyzing weather data corresponding to telematics data, the computing device 120 may adjust (e.g., increase) a risk score associated with the owner or renter to reflect riskier driving behavior.

In some embodiments, the risk score may indicate an absolute risk level associated with the owner or renter. That is, an owner's or renter's driving behavior may be determined based on only telematics data and/or other historical data, and therefore may be determined independently of the driving behavior of other drivers.

In some embodiments, to determine one or more driving behaviors of the owner or renter, the computing device 120 may generate or otherwise receive a model 200 that represents one or more baseline driving behaviors, so that model 200 may serve as a point of reference when evaluating an absolute risk score. In an embodiment, to generate model 200, computing device 120 may access data from one or more databases 128-1, 128-2, ... 128-N that define "safe" aspects of driving behavior for various locations. For example, if a particular portion of a roadway contains many sharp turns and is marked with a speed limit sign of 15 mph, model 200 may define a "safe" baseline driving behavior for the particular portion of the roadway, such as average braking (e.g., indicated by a number of braking events, whether such braking is hard or soft, deceleration rate during braking, distance to stop, etc.) to accommodate the sharp turns and average speed (e.g., 15 mph). The computing device 120 may analyze the telematics data and/or other historical data of an owner or renter who traverses the particular portion of a roadway against model 200 to identify the driving behavior, for example. If the evaluation shows that the owner or renter deviates from the "safe" baseline driving behavior by driving slower and is more cautious, the driving score may be adjusted to demonstrate that the owner or renter is exhibiting low risk driving. In contrast, if the evaluation shows that the owner or renter deviates from the "safe" baseline driving behavior by driving much faster, the risk score may be adjusted to demonstrate that he or she is exhibiting higher risk driving.

In other embodiments, the risk score may indicate relative risk levels in comparison with one or more risk scores associated with a plurality of other drivers. That is, an owner's or renter's driving behavior may be determined relative to telematics data and/or other historical data from other drivers (e.g., other participating owners and/or renters). For instance, telematics data from hundreds or thousands of drivers in an area and/or along a particular portion of a roadway (e.g., a city, a census tract, a parking lot, a block of a street, a highway section, an intersection, an entrance or exit ramp, etc.) may reveal a typical or average driving behavior for a specific driving environment and/or type of driving environment. By comparing the owner's or renter's telematics data with that of the other drivers across a common context (e.g., with respect to the same particular portion of a roadway), the present embodiments may be configured to identify the owner's or renter's driving behavior.

A vehicle-sharing platform profile may store the risk score, whether absolute or relative, indicative of an evaluation of the owners' and renters' driving behaviors as evaluated by the computing device 120 based upon the telematics data and/or other historical data. Thus, the vehicle-sharing platform may (1) identify driving behavior (s) (e.g., accelerating behavior, braking behavior) of a vehicle owner using the vehicle owner's telematics data (e.g., risk score), (2) make a baseline assumption that the vehicle owner desires the same (or safer) driving behaviors in a potential renter of the owner's vehicle, and (3) predict preference value(s) based on the identified driving behaviors that define one or more criteria for vehicle renters with whom the owner's vehicle can be shared. The vehicle-sharing platform may also identify renter telematics data, and compare the renter telematics data, or data derived therefrom, with the one or more user preference values to determine whether the potential vehicle renter satisfies the one or more criteria.

Exemplary Computing Device with PPE

Figure 3:
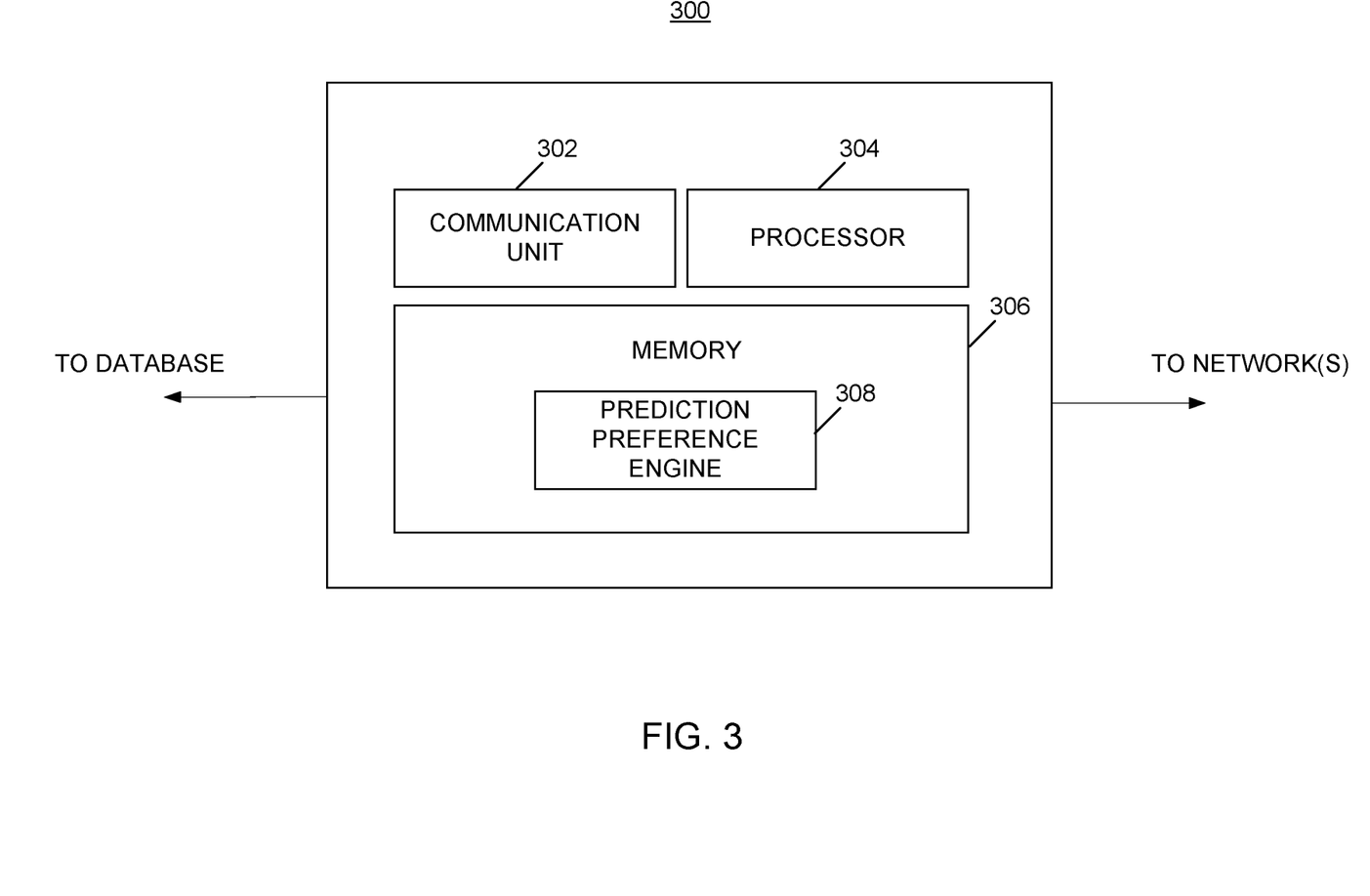
FIG. 3 illustrates a block diagram of an exemplary computing device having a preference prediction engine in accordance with one aspect of the present disclosure.

FIG. 3 illustrates a block diagram of an exemplary computing device 300 (e.g., computing device 120 of FIG. 1) in accordance with an exemplary aspect of the present disclosure. Computing device 300 includes communication unit 302, processor 304, and memory 306. Memory 306 may store a prediction preference engine (PPE) 308 (e.g., PPE 125 of FIG. 1). The computing device 300 may include additional, fewer, or alternate components, including those discussed elsewhere herein.

Computing device 300 may be implemented as any suitable computing or mobile device. For example, computing device 300 may be implemented within one or more servers.

Communication unit 302 may be configured to facilitate data communications between PPE 308 and one or more databases and/or networks, such as one or more of databases 128-1, 128-2, . . . 128-N and/or network 106, as previously discussed with reference to FIG. 1, for example. Communication unit 302 may be configured to facilitate such communications in accordance with any suitable communication protocol or combination of protocols. In various aspects, communication unit 302 may be configured to utilize the same or different communication protocols to facilitate respective communications between one or more databases 128-1, 128-2, . . . 128-N and network 106. In an aspect, communication unit 302 may be configured to send data to front end devices 102, for example, as shown in FIG. 1.

Communication unit 302 may send data in accordance with one or more applications (e.g., vehicle-sharing applications) executed on one or more devices that are part of the front end devices 102, such as devices 122, 123 as shown in FIG. 1. Communication unit 302 may send data that enables owner device 123 to display user preferences in accordance with embodiments described herein. Communication unit 302 may also be configured to receive data from one or more devices, such as devices 122, 123 as shown in FIG. 1.

The data received from renter device 122 may be processed by processor 304 and utilized to identify that the renter has requested to rent a vehicle from a vehicle owner having preferences that the renter satisfies.

As will be appreciated by those of ordinary skill in the relevant art(s), communication unit 302 may be implemented with any combination of suitable hardware, firmware and/or software to enable these functions. For example, communication unit 302 may be implemented with any number of wired and/or wireless transceivers, network interfaces, physical layers (PHY), etc. Communication unit 302 may optionally enable communications between PPE 308 and one or more additional networks, which may or may not be part of network 106. For example, communication unit 302 may be configured to communicate with cellular networks in addition to network 106.

Processor 304 may be configured to communicate with memory 306 to store to and read data from memory 306. In accordance with various aspects, memory 306 is a computer-readable non-transitory storage device that may include any combination of volatile memory (e.g., a random access memory (RAM)) and/or non-volatile memory (e.g., battery-backed RAM, FLASH, etc.). Memory 306 may be configured to store instructions executable on processor 304. These instructions may include machine readable instructions that, when executed by processor 304, cause processor 304 to perform various acts. PPE 308 stored in memory 306 may specifically be configured to store instructions executable by processor 304 to predict user preferences.

For example, PPE 308 may include instructions and/or algorithms that, when executed by processor 304, cause processor 304 to communicate with owner device 123 to facilitate the prediction of a user preference, e.g., as discussed above in connection with FIGS. 1 and 2. The executable instructions may enable communications unit 302 to send data to owner device 123 that causes owner device 123 to display user preferences. In some embodiments, PPE 308 may include instructions, that when executed by processor 304, cause processor 304 to retrieve data from one or more of databases 128-1, 128-2, . . . 128-N to predict user preferences.

Exemplary User Navigation Path Using Vehicle-Sharing Platform

Figure 4:
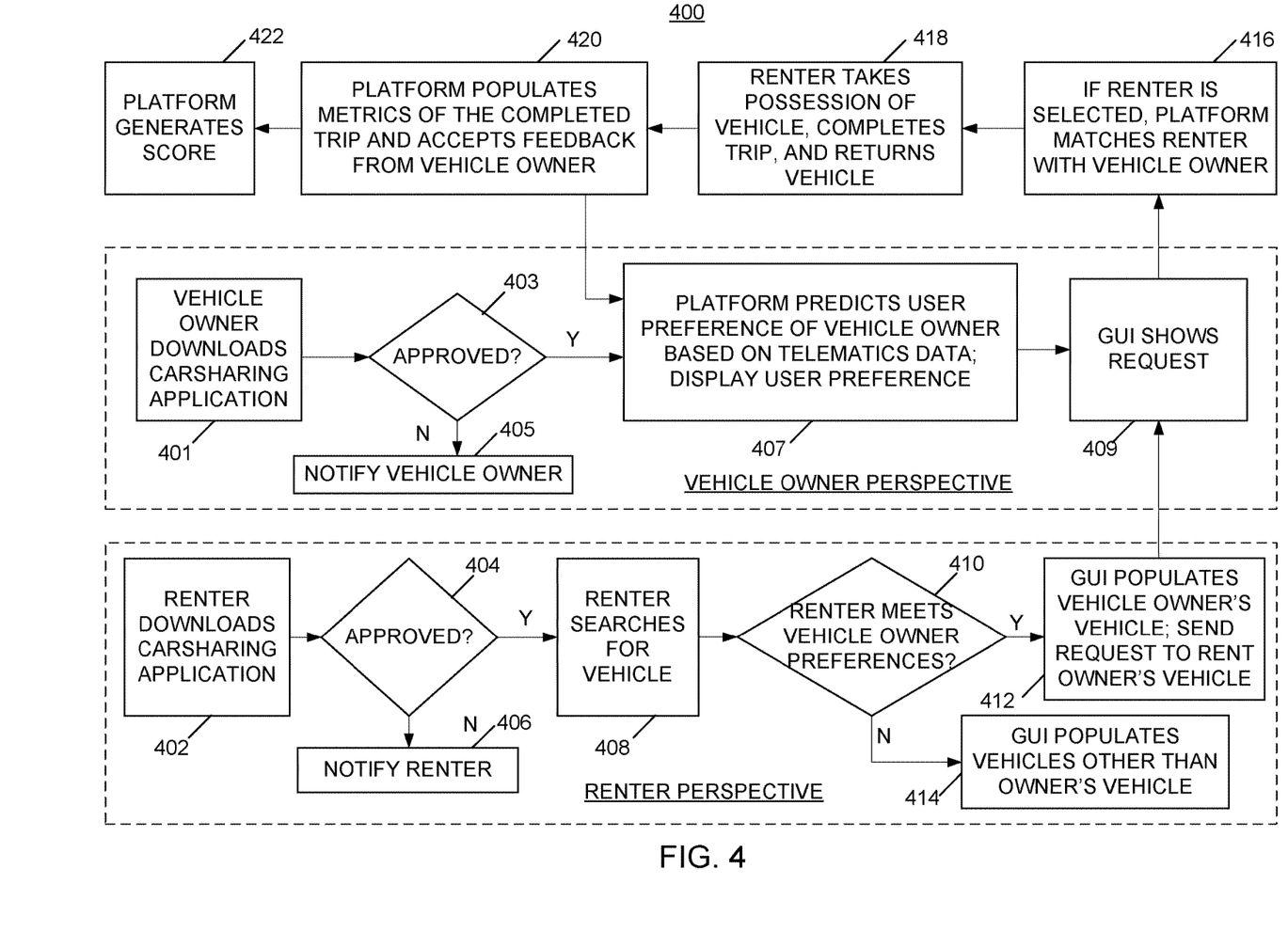
FIG. 4 illustrates a flow diagram of exemplary user navigation paths in accordance with one aspect of the present disclosure.

FIG. 4 illustrates a flow diagram 400 of exemplary user navigation paths, from the perspective of both the vehicle owner and renter, for facilitating vehicle-sharing between the two parties in accordance with an exemplary aspect of the present disclosure.

Flow diagram 400 may begin with the vehicle owner and renter each downloading a P2P vehicle-sharing application (e.g., dedicated application 121) using their respective devices (e.g., devices 123, 122), as shown in blocks 401 and 402, respectively, in order to participate in the vehicle-sharing platform (e.g., vehicle-sharing platform 100). The vehicle-sharing platform may perform an approval process, as shown in blocks 403 and 404, by requiring each party to accept terms of usage and/or pass one or more background checks (e.g., age check, valid driver's license check, criminal background check, vehicle driving history, etc.). If any of the parties fails to pass the approval process, the vehicle-sharing platform may notify the ineligible party, as shown in blocks 405 and 406, and/or present reasons as to why the party failed the approval process. If any of the parties pass the approval process, the party may be considered as an active participant of the vehicle-sharing platform and may be given access to use the vehicle-sharing platform.

With respect to the renter, the vehicle-sharing platform 100 may receive an indication that the renter has agreed to terms, as part of the approval process, for renting a vehicle from the vehicle owner. The terms may include a notice that vehicle owners have the right to set and apply customized user preferences and/or other restrictions on their vehicles, and that the number of available vehicles for rent to the renter may be affected by how well various characteristics of the renter "fits" the vehicle owner's preferences. Accordingly, in some embodiments, the terms may include a notice that various data (e.g., historical data, rental evaluation data) may be collected (e.g., via renter device 122) and used in order to be granted access to the vehicle sharing platform 100 and/or to evaluate whether the renter "fits" the vehicle owner's preferences. The terms may include a notice that vehicle telematics data may be collected (e.g., via renter device 122) during the rental trip, and/or that penalties or incentives may be applied to the renter based upon the vehicle telematics data.

As shown in block 407, upon approval for participation in the vehicle-sharing platform 100, the vehicle-sharing platform may predict the user preference of the owner based on telematics data associated with the vehicle owner. For example, the vehicle-sharing platform 100 or a component thereof (e.g., PPE 125) may process the telematics data or a risk score stored in databases 128-1, 128-2, . . . , 128-N to determine the user preference. Optionally, the vehicle owner's device 123, via a GUI (e.g., GUI 119) of the vehicle-sharing application, may display the predicted user preference. The vehicle owner may also set up a profile by creating a login name and password to describe the vehicle available for rent, specify a price to rent the vehicle, etc. The profile may also include a switch that may be toggled to activate or deactivate the rental availability of the vehicle.

Upon approval for participation in the vehicle-sharing platform 100, the renter's device (e.g., device 122), via a GUI (e.g., GUI 119) of the vehicle-sharing application, may display a search portal for the renter to input details (e.g., which type of vehicle he desires, pick-up location, day, and time, drop-off location, day, and time, etc.) for a rental vehicle request, thereby allowing the renter to search for vehicles as shown in block 408. The vehicle-sharing platform 100 (e.g., computing device 120), based upon the input details provided by the renter, may search for available vehicles based upon the rental vehicle request by querying a database (e.g., database 128-1) against the input details and present any available vehicles in a results page.

In order to determine whether the owner's vehicle should appear as an available vehicle on the renter's results page, computing device 120 may determine, as shown in block 410, whether the renter (i.e., qualifications of the renter, as described by telematics and/or other historical data, and/or by rental evaluation data) and/or input details of the rental vehicle request satisfy the vehicle owner preferences that were predicted in block 407. If the renter and/or input details satisfy the vehicle owner preferences, the renter's results page may display the vehicle owner's vehicle as available, as shown in block 412. The renter may proceed by selecting the owner's vehicle to rent, selecting other vehicles available from other vehicle owners that the renter may be qualified to rent, or may decide not to select any vehicles. If the renter and/or input details do not satisfy the vehicle owner preferences, the renter's results page may not display the vehicle owner's vehicle as available, as shown in block 414, but may otherwise display other vehicles available from other vehicle owners that the renter may be qualified to rent.

Upon selecting the owner's vehicle to rent and subsequently sending a request to the vehicle owner via the renter's device across a network (e.g., network 106), as shown in block 412, the GUI shown on the vehicle owner's device (e.g., device 123) may populate the request, as shown in block 409. The computing device 120, for example, may facilitate the transfer of the request between the renter's device and the vehicle owner's device (e.g., by receiving the request from renter device 122 and forwarding the request to owner device 123). The request may include some or all of the input details described above. If the vehicle owner decides to accept the request, the computing device 120 may match the renter with the vehicle owner, as shown in block 416, to facilitate coordination of the vehicle sharing and communication between the two parties. In some embodiments, the vehicle-sharing platform may enable in-app messaging to facilitate communications (e.g., via text messages) between the renter and vehicle owner upon a match.

As shown in block 418, the renter may proceed to physically take possession of the owner's vehicle at the designated agreed upon day, time, and pick-up location, and return the owner's vehicle at the end of the trip at the designated agreed upon day, time, and drop-off location. During the rental trip, the vehicle-sharing platform may generate telematics data of the vehicle via sensors associated with the vehicle and/or the renter's device (e.g., device 122) that may be present in the vehicle during the rental trip. At the end of the rental trip, the vehicle-sharing platform may utilize location-tracking technologies (e.g., GPS) of the vehicle to confirm that the vehicle has been dropped-off at the correct location.

The vehicle-sharing platform may populate metrics of the completed trip and accept feedback from the vehicle owner as shown in block 420, and calculate a driving score for the renter based upon the telematics data as shown in block 422. The metrics and/or score may be populated as an in-app message and shared between the two parties, or may otherwise be delivered to notify the vehicle owner and/or vehicle renter. The driving score may also take into consideration any feedback from the vehicle owner. For example, if the vehicle has scratches on the car that were not there prior to the rental trip, or if the interior of the vehicle has been damaged, the driving score may be lowered. If the vehicle is in the same condition as it was prior to the rental trip, or if the renter took measures to improve the conditions of the vehicle (e.g., cleaned the car), the driving score may be increased.

Figure 5:
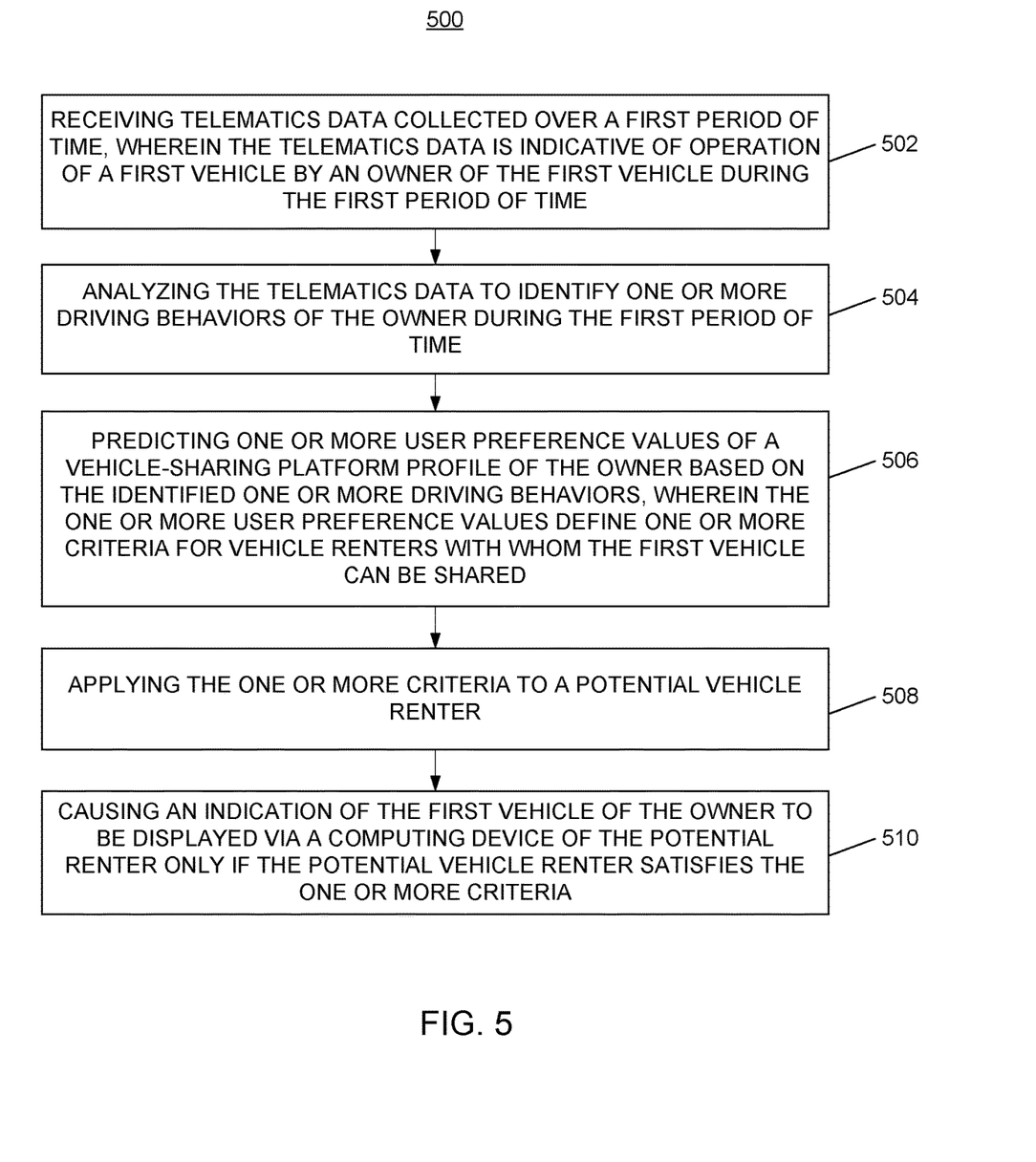
FIG. 5 illustrates an exemplary method performed by an exemplary vehicle-sharing platform or component(s) thereof in accordance with one aspect of the present disclosure.

Exemplary Methods of Determining User Preferences Based on Vehicle Owner's Telematics Data for a Vehicle-Sharing Platform FIG. 5 illustrates an example method 500 in accordance with an exemplary aspect of the present disclosure. Method 500 may be performed by exemplary vehicle-sharing platform 100, and more particularly, by computing device 120 of FIG. 1, for example. The information displayed in method 500 (e.g., user preferences) may be displayed via a suitable GUI (e.g., GUI 119) running on a suitable device (e.g., owner device 123), for example.

In method 500, telematics data collected over a period of time is received (block 502). The telematics data may be indicative of operation of a vehicle by an owner of the vehicle during the period of time, which may be a contiguous or non-contiguous time period. One of ordinary skill in the art would recognize that the period of time may be a design choice. Generally, the greater the period of time (e.g., greater than 5 years), the more rich the telematics data may be, and therefore the driving behavior identified may be more accurate.

Method 500 may then analyze the telematics data to identify one or more driving behaviors of the owner during the period of time (block 504). As described above with respect to FIG. 2, computing device 120 may analyze telematics data, including one or more sets of operation data (e.g., acceleration data, braking data, speeding data) to identify one or more driving behaviors (e.g., abrupt acceleration, frequently driving under the speed limit, etc.).

Method 500 may then predict one or more user preference values of a vehicle-sharing platform profile of the owner based on the identified one or more driving behaviors (block 506). Generally, the user preference values define one or more criteria for vehicle renter with whom the vehicle can be shared. In some embodiments, the one or more user preference values may correspond to the average or range of values of the operation data mentioned above. For example, if telematics data associated with the vehicle owner includes speeding data, acceleration data, and braking data, a user preference for speed may be "no more than 3 mph over speed limit" or "no more than 7 mph over speed limit on highways," a user preference for acceleration may be "no greater than 12 mph/sec," and a user preference for braking may be "no less than 15 ft/sec$^2$," etc.

Method 500 may then apply the one or more criteria to a potential vehicle renter (block 508). In an embodiment, the vehicle-sharing platform may receive third-party data associated with the potential renter from third-party servers, and subsequently compare the third-party data with user preference values represented by the criteria. Such third-party data may be telematics data collected during trips of vehicles owned by the potential renter. Alternatively or in addition, in an embodiment, the vehicle-sharing platform may receive telematics associated with the potential renter from vehicle-sharing platform database 128-1, and subsequently compare the telematics data with user preference values represented by the one or more criteria. Such telematics data may be collected during rental trips using vehicles owned by other vehicle owners participating in the vehicle-sharing platform, for example.

Method 500 may then cause an indication of the vehicle of the owner to be displayed via a mobile device of the potential renter (e.g., renter device 122) only if the potential vehicle renter satisfies the one or more criteria of the owner described above (block 510). If the renter satisfies the one or more criteria of the owner, for example, the make, year, and/or model of the vehicle may appear in a list with other vehicles available for rent. As another example, an image of the vehicle may be displayed. Other suitable ways of graphically indicating that the vehicle is available to the potential renter via the vehicle-sharing application are also contemplated.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain aspects are described herein as including logic or a number of components or modules. Modules may constitute either software modules (e.g., code stored on a machine-readable medium) or hardware modules. A hardware module is tangible unit capable of performing certain operations and may be configured or arranged in a certain manner. In example aspects, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In some cases, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering aspects in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In aspects in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example aspects, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example aspects, the processor or processors may be located in a single location (e.g., within a home environment, an office environment or as a server farm), while in other aspects the processors may be distributed across a number of locations.

The one or more processors may also operate to support performance of the relevant operations in a "cloud computing" environment or as a Software as a service (SaaS). For example, at least some of the operations may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example aspects, the one or more processors or processor-implemented modules may be located in a single geographic location (e.g., within a home environment, an office environment, or a server farm). In other example aspects, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one aspect" or "an aspect" means that a particular element, feature, structure, or characteristic described in connection with the aspect is included in at least one aspect. The appearances of the phrase "in one aspect" in various places in the specification are not necessarily all referring to the same aspect.

Some aspects may be described using the expression "coupled" and "connected" along with their derivatives. For example, some aspects may be described using the term "coupled" to indicate that two or more elements are in direct physical or electrical contact. The term "coupled," however, may also mean that two or more elements are not in direct contact with each other, but yet still co-operate or interact with each other. The aspects are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, condition A or B is satisfied by any one of the following: A is true (or present) and B is false (or not present), A is false (or not present) and B is true (or present), and both A and B are true (or present).

In addition, use of the "a" or "an" are employed to describe elements and components of the aspects herein. This is done merely for convenience and to give a general sense of the description. This description should be read to include one or at least one and the singular also includes the plural unless it is obvious that it is meant otherwise.

Also, the patent claims at the end of this patent application are not intended to be construed under 35 U.S.C. § 112(f) unless traditional means-plus-function language is expressly recited, such as "means for" or "step for" language being explicitly recited in the claim(s).

Upon reading this disclosure, those of ordinary skill in the art will appreciate still additional alternative structural and functional designs for providing an interface to streamline a user's experience with a vehicle sharing application through the disclosed principles herein. Thus, while particular aspects and applications have been illustrated and described, it is to be understood that the disclosed aspects are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A computer-implemented method of predicting a user preference carried out by a vehicle-sharing platform, the method comprising:
  receiving, by one or more processors, telematics data collected over a first period of time, wherein the telematics data is indicative of operation of a first vehicle by an owner of the first vehicle during the first period of time;
  analyzing, by the one or more processors, the telematics data to identify one or more driving behaviors of the owner during the first period of time;
  predicting, by the one or more processors, one or more user preference values of a vehicle-sharing platform profile of the owner based on the identified one or more driving behaviors, wherein the one or more user preference values define one or more criteria for vehicle renters with whom the first vehicle can be shared;
  applying, by the one or more processors, the one or more criteria to a potential vehicle renter; and
  causing, by the one or more processors, an indication of the first vehicle of the owner to be displayed via a mobile device of the potential renter only if the potential vehicle renter satisfies the one or more criteria.

2. The computer-implemented method of claim 1, wherein applying the one or more criteria to the potential vehicle renter includes:
  receiving, by the one or more processors, renter telematics data collected over a second period of time, wherein the renter telematics data is indicative of operation of a second vehicle by the potential vehicle renter during the second period of time; and
  determining, by the one or more processors, whether the potential vehicle renter satisfies the one or more criteria by comparing the renter telematics data, or data derived therefrom, with the one or more user preference values.

3. The computer-implemented method of claim 2, wherein the second vehicle is a rental vehicle shared by another vehicle owner.

4. The computer-implemented method of claim 2, wherein the second vehicle is a vehicle owned by the potential renter.

5. The computer-implemented method of claim 1, further comprising:
  causing, by the one or more processors, the one or more user preference values to be displayed via a mobile device of the owner.

6. The computer-implemented method of claim 5, further comprising:
  modifying, by the one or more processors, the one or more user preference values based on an input received via the mobile device of the owner.

7. The computer-implemented method of claim 1, wherein the at least one of the one or more user preference values is associated with one or more of: acceleration, speed, lateral force, or time period.

8. A computer system implementing a vehicle-sharing platform for predicting a user preference, the computer system comprising:
one or more processors; and
memory coupled to the one or more processors and storing executable instructions that when executed by the one or more processors cause the computer system to:
receive telematics data collected over a first period of time, wherein the telematics data is indicative of operation of a first vehicle by an owner of the first vehicle during the first period of time;
analyze the telematics data to identify one or more driving behaviors of the owner during the first period of time;
predict one or more user preference values of a vehicle-sharing platform profile of the owner based on the identified one or more driving behaviors, wherein the one or more user preference values define one or more criteria for vehicle renters with whom the first vehicle can be shared;
apply the one or more criteria to a potential vehicle renter; and
cause an indication of the first vehicle of the owner to be displayed via a mobile device of the potential renter only if the potential vehicle renter satisfies the one or more criteria.

9. The computer system of claim 8, wherein the executable instructions cause the computing system to apply the one or more criteria to the potential vehicle renter by:
receiving renter telematics data collected over a second period of time, wherein the renter telematics data is indicative of operation of a second vehicle by the potential vehicle renter during the second period of time; and
determining whether the potential vehicle renter satisfies the one or more criteria by comparing the renter telematics data, or data derived therefrom, with the one or more user preference values.

10. The computer system platform of claim 9, wherein the second vehicle is a rental vehicle shared by another vehicle owner.

11. The computer system of claim 9, wherein the second vehicle is a vehicle owned by the potential renter.

12. The computer system of claim 8, wherein the executable instructions further cause the computer system to:
display the one or more user preference values via a mobile device of the owner.

13. The computer system of claim 12, wherein the executable instructions that when executed by the one or more processors further cause the computer system to:
modify the one or more user preference values based on an input received via the mobile device of the owner.

14. The computer system of claim 8, wherein the at least one of the one or more user preference values is associated with one or more of: acceleration, speed, lateral force, or time period.

15. A non-transitory, tangible computer-readable medium storing machine readable instructions for predicting a user preference that, when executed by one or more processors of a vehicle-sharing platform, cause the one or more processors to:
receive telematics data collected over a first period of time, wherein the telematics data is indicative of operation of a first vehicle by an owner of the first vehicle during the first period of time;
analyze the telematics data to identify one or more driving behaviors of the owner during the first period of time;
predict one or more user preference values of a vehicle-sharing platform profile of the owner based on the identified one or more driving behaviors, wherein the one or more user preference values define one or more criteria for vehicle renters with whom the first vehicle can be shared;
apply the one or more criteria to a potential vehicle renter; and
cause an indication of the first vehicle of the owner to be displayed via a mobile device of the potential renter only if the potential vehicle renter satisfies the one or more criteria.

16. The non-transitory, tangible computer-readable medium of claim 15, wherein the machine readable instructions cause the one or more processors to apply the one or more criteria to the potential vehicle renter by:
receiving renter telematics data collected over a second period of time, wherein the renter telematics data is indicative of operation of a second vehicle by the potential vehicle renter during the second period of time; and
determining whether the potential vehicle renter satisfies the one or more criteria by comparing the renter telematics data, or data derived therefrom, with the one or more user preference values.

17. The non-transitory, tangible computer-readable medium of claim 16, wherein the second vehicle is a rental vehicle shared by another vehicle owner.

18. The non-transitory, tangible computer-readable medium of claim 15, wherein the machine readable instructions further cause the one or more processors to:
display the one or more user preference values via a mobile device of the owner.

19. The non-transitory, tangible computer-readable medium of claim 18, wherein the machine readable instructions further cause the one or more processors to:
modify the one or more user preference values based on an input received via the mobile device of the owner.

20. The non-transitory, tangible computer-readable medium of claim 15, wherein the at least one of the one or more user preference values is associated with one or more of: acceleration, speed, lateral force, or time period.

* * * * *